United States Patent
Mong

(10) Patent No.: US 11,818,214 B2
(45) Date of Patent: *Nov. 14, 2023

(54) VEHICLE CONTROL SYSTEM

(71) Applicant: Transportation IP Holdings, LLC, Norwalk, CT (US)

(72) Inventor: Tab Robert Mong, Erie, PA (US)

(73) Assignee: TRANSPORTATION IP HOLDINGS, LLC

(*) Notice: Subject to any disclaimer, the term of this patent is extended or adjusted under 35 U.S.C. 154(b) by 0 days.

This patent is subject to a terminal disclaimer.

(21) Appl. No.: 17/197,748

(22) Filed: Mar. 10, 2021

(65) Prior Publication Data

US 2021/0194968 A1 Jun. 24, 2021

Related U.S. Application Data

(63) Continuation of application No. 15/671,204, filed on Aug. 8, 2017, now Pat. No. 10,979,506.

(Continued)

(51) Int. Cl.
*H04L 29/08* (2006.01)
*H04L 67/12* (2022.01)
(Continued)

(52) U.S. Cl.
CPC .......... *H04L 67/12* (2013.01); *B61L 15/0036* (2013.01); *B61L 15/0072* (2013.01);
(Continued)

(58) Field of Classification Search
None
See application file for complete search history.

(56) References Cited

U.S. PATENT DOCUMENTS

| 2013/0041547 A1 | 2/2013 | Goodermuth et al. |
| 2013/0145360 A1* | 6/2013 | Ricci .................. H04W 4/48 717/174 |

(Continued)

FOREIGN PATENT DOCUMENTS

| CN | 101123456 A | 2/2008 |
| CN | 101127916 A | 2/2008 |
| CN | 102546726 A | 7/2012 |

OTHER PUBLICATIONS

Philipp Meyer, Extending IEEE 802.1 AVB with Time-triggered scheduling: A Simulation Study of the Coexistence of Synchronous and Asynchronous Traffic, IEEE, pp. 47-54, (Year 2013).*
Extended European Search Report dated May 11, 2021 for corresponding Application No. 21155038.9 (7 pages).
The First Office Action dated Nov. 1, 2021 for corresponding Chinese Application No. 201780070704.8. (10 Pages).

(Continued)

*Primary Examiner* — Kouroush Mohebbi
(74) *Attorney, Agent, or Firm* — The Small Patent Law Group LLC; William Breeze

(57) ABSTRACT

A control system includes a controller configured to control communication between or among plural vehicle devices that control operation of a vehicle via a network that communicatively couples the vehicle devices. The controller also is configured to control the communication using a data distribution service (DDS) and with the network operating as a time sensitive network (TSN). The controller is configured to direct a first set of the vehicle devices to communicate using time sensitive communications, a different, second set of the vehicle devices to communicate using best effort communications, and a different, third set of the vehicle devices to communicate using rate constrained communications.

18 Claims, 3 Drawing Sheets

Related U.S. Application Data

(60) Provisional application No. 62/396,487, filed on Sep. 19, 2016.

(51) Int. Cl.
| | | |
|---|---|---|
| *B61L 15/00* | (2006.01) | |
| *H04W 4/48* | (2018.01) | |
| *B61L 23/00* | (2006.01) | |
| *H04L 12/54* | (2022.01) | |
| *H04L 45/50* | (2022.01) | |
| *H04L 47/24* | (2022.01) | |
| *H04L 47/10* | (2022.01) | |

(52) U.S. Cl.
CPC ............ *B61L 23/005* (2013.01); *H04L 12/56* (2013.01); *H04L 45/50* (2013.01); *H04W 4/48* (2018.02); *H04L 47/10* (2013.01); *H04L 47/24* (2013.01)

(56) References Cited

U.S. PATENT DOCUMENTS

| | | | |
|---|---|---|---|
| 2014/0125498 A1 | 5/2014 | Curry et al. | |
| 2014/0129060 A1* | 5/2014 | Cooper | G07C 5/02 701/19 |
| 2015/0375764 A1 | 12/2015 | Rajendran et al. | |

OTHER PUBLICATIONS

English translation of the First Office Action dated Nov. 1, 2021 for corresponding Chinese Application Na 201780070704.8. (10 Pages).

Search Report for corresponding Chinese Application No. 201780070704.8. (3 Pages).

Amel, et al. "Data Distribution Service on Top of Ethernet Networks". © 2015 IEEE, 5 Pages.

Kamieth, et al, "Design of Tdma-based In-Car Networks: Applying Multiprocessor Scheduling Strategies on Time-triggered Switched Ethernet Communication". Emerging Technology and Factory Automation—2014 IEEE. 9 Pages.

Salaberria, et al. "Ubiquitous Connected Train Based on Train-to-Ground and Intra-Wagon Communications Capable of Providing on Trip Customized Digital Services for Passengers". www.mdpi.com/journal/sensors. May 5, 2014. pp. 8003-8025.

Sommer, et al. "RACE: A Centralized Platform Computer Based Architecture for Automotive Applications"©2013 IEEE, 6 Pages.

Wikipedia, "Data Distribution Service", https://en.wikipedia.org/wiki/Data_Distribution_Service. 3 Pages.

Wikipedia, "Time-SensitiveNetworking", https://en.wikipedia.org/wiki/Time-Sensitive_Networking. 15 Pages.

Office Action dated Jan. 18, 2023 for corresponding Canadian Patent Application No. 3,037,306 (4 pages).

Extended European Search Report dated Aug. 10, 2023 for corresponding EP Patent Application No. 23 171 693.7 (7 pages).

\* cited by examiner

VEHICLE CONTROL SYSTEM

CROSS-REFERENCE TO RELATED APPLICATIONS

This application is a continuation of U.S. patent application Ser. No. 15/671,204 (filed 8 Aug. 2017), which claims priority to U.S. Provisional Patent Application No. 62/396,487 (filed 19 Sep. 2016). The entire disclosures of these applications are incorporated herein by reference.

FIELD

Embodiments of the present disclosure generally relate to systems and methods for controlling vehicles, such as automobiles, rail vehicles, marine vessels, etc.

BACKGROUND

Movement of vehicles is controlled by control systems that receive user input and communicate control signals to components of the vehicles to implement actions dictated by the user input. For example, a vehicle operator may depress a pedal, move a lever, or take other action to change a throttle setting of a vehicle or activate a brake of the vehicle. Responsive to this operator input, a control system of the vehicle may communicate signals (e.g., changes in voltages, currents, etc.) to engines, motors, brakes, etc., of the vehicle in order to implement the operator input (and change the throttle or activate the brake, as appropriate).

The control systems of some vehicles may be complex in that many components communicate with each other. Not all of these components, however, may communicate signals of the same or similar importance or criticality to operation of the vehicle. For example, components that measure operations of the vehicle (e.g., location, speed, etc.), components that record events occurring during movement of the vehicle, components that measure fuel onboard the vehicle, etc., may communicate signals that are less important to ensuring the safe operation of the vehicle compared to other communications, such as signals communicated with motors of the vehicle, signals communicated with input/output devices, etc.

The control systems may use different communication networks within a vehicle to ensure that the more important or critical communications and the less important or less critical communications are all successfully communicated. But, using many different communication networks within a vehicle can present unnecessarily complexity. For example, some components may not be able to communicate with each other without the communications being relayed and/or converted by another component. As the number of networks and components needed to communicate within a vehicle control system increases, the potential points of failure and complexity of ensuring that communications successful occur increase.

BRIEF DESCRIPTION

In one embodiment, a control system includes a controller configured to control communication between or among plural vehicle devices that control operation of a vehicle via a network that communicatively couples the vehicle devices. The controller also is configured to control the communication using a data distribution service (DDS) and with the network operating as a time sensitive network (TSN). The controller is configured to direct a first set of the vehicle devices to communicate using time sensitive communications, a different, second set of the vehicle devices to communicate using best effort communications, and a different, third set of the vehicle devices to communicate using rate constrained communications.

In one embodiment, a control system includes a controller configured to control communication between plural vehicle devices that control one or more operations of a vehicle. The controller also is configured to control the communication between or among the vehicle devices through an Ethernet network while the Ethernet network operates as a time sensitive network (TSN). The controller is configured to direct a first set of the vehicle devices to communicate using time sensitive communications, a different, second set of the vehicle devices to communicate using best effort communications, and a different, third set of the vehicle devices to communicate using rate constrained communications.

In one embodiment, a control system includes a controller configured to control communications between plural vehicle devices onboard a vehicle through a time sensitive network (TSN). The controller is configured to direct a first set of the vehicle devices to communicate using time sensitive communications, a different, second set of the vehicle devices to communicate using best effort communications, and a different, third set of the vehicle devices to communicate using rate constrained communications.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
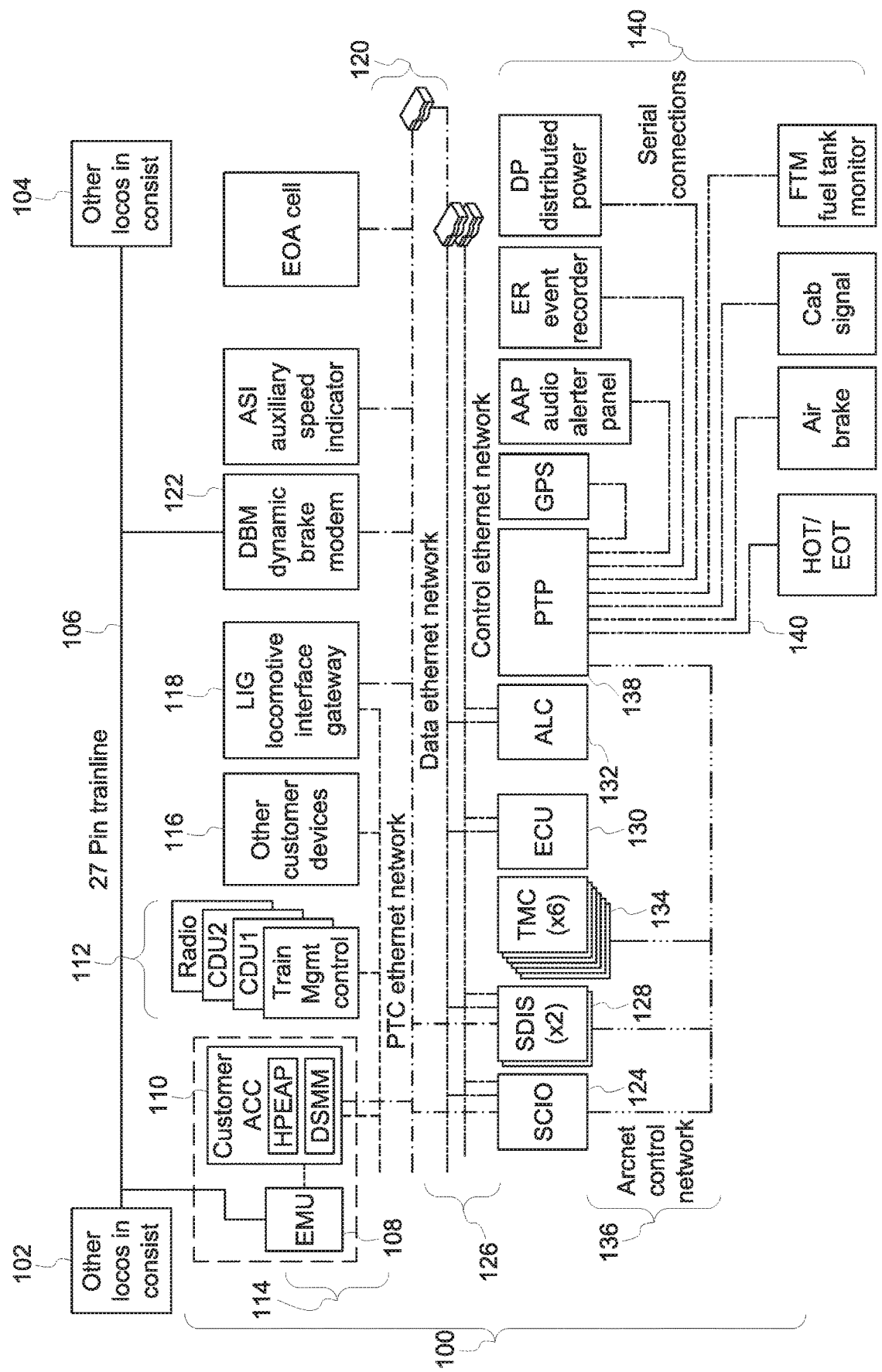
FIG. 1 illustrates one example of a vehicle control system.

FIG. 1 illustrates one example of a vehicle control system 100. The vehicle control system 100 may be disposed onboard one or more vehicles of a vehicle system. For example, the control system 100 may be disposed onboard a locomotive of a rail vehicle system formed from the locomotive and one or more other locomotives 102, 104. The locomotives in the vehicle system are communicatively coupled by a wired connection 106, such as a 27-pin trainline cable. Other control systems identical or similar to the control system 100 shown in FIG. 1 may be disposed onboard the other locomotives 102, 104, with the various control systems 100 communicatively coupled (e.g., able to communicate with each other via) the wired connection 106. While the control system 100 is shown as being disposed onboard a locomotive of a rail vehicle system, alternatively, the control system 100 may be disposed onboard another type of vehicle. For example, the control system 100 may be disposed onboard an automobile, a marine vessel, a mining vessel, or another off-highway vehicle (e.g., a vehicle that is not legally permitted or that is not designed for travel along public roadways).

The control system 100 communicates via the wired connection 106 via a vehicle system interface device 108 ("EMU" in FIG. 1), such as an Ethernet over a multiple unit (MU) cable interface. The interface device 108 represents communication circuitry, such as modems, routing circuitry, etc. A front end controller 110 ("Customer ACC" in FIG. 1) is coupled with the interface device 108 by one or more wired connections. The controller 110 represents hardware circuitry that couples with (e.g., receives) one or more other circuits (e.g., compute cards) that control operation of the control system 100. As shown in FIG. 1, the controller 110 also may be connected with the second communication network 120.

Several control devices 112, such as a radio, display units, and/or vehicle system management controllers, are connected with the interface device 108 and the controller 110 via a first communication network 114 ("PTC Ethernet Network" in FIG. 1). The communication network 114 may be an Ethernet network that communicates data packets between components connected to the network 114. One or more other devices 116 may be connected with the network 114 to provide other functions or control over the vehicle.

The networks described herein can be formed from a structure of communication devices and hardware, such as cables interconnecting devices, wireless devices interconnecting other devices, routers interconnecting devices, switches interconnecting devices, transceivers, antennas, and the like. One or more networks described herein can be entirely off-board all vehicles. Optionally, at least part of a network can be disposed onboard one or more vehicles, such as by having one or more hardware components that form the network being onboard a vehicle and communicating in the network as the vehicle is moving. Additionally or alternatively, a network can be disposed entirely onboard a vehicle or vehicle system, such as when the components communicating with each other to form the network are all disposed onboard the same vehicle or onboard multiple vehicles that travel together along routes as a vehicle system.

An interface gateway 118 also is connected the first communication network 114. The interface gateway 118 is referred to as a locomotive interface gateway ("LIG" shown in FIG. 1), but optionally may be referred to by another name depending on the type of vehicle that the interface gateway 118 is disposed upon. The interface gateway 118 represents hardware circuitry that communicatively couples the first network 114 with at least a second communication network 120. In the illustrated embodiment, the second communication network 120 is referred to as a data Ethernet network, and can represent an Ethernet network similar to the first network 114.

The interface gateway 118 can provide a communication bridge between the two networks 114, 120. For example, the interface gateway 118 can change protocols of communications between the two networks 114, 120, can determine which communications to allow to be communicated from a device on one network 114 or 120 to a device on the other network 120 or 114 (for example, by applying one or more rules to determine which communications may be allowed to pass between the networks 114, 120), or otherwise control communications between the two networks 114, 120.

A dynamic brake modem 122 ("DBM" in FIG. 1) also is connected with the second network 120. This brake modem 122 also can be referred to as a dynamic brake modem. The dynamic brake modem 122 also may be connected with the wired connection 106. The dynamic brake modem 122 represents hardware circuitry that receives control signals from one or more other vehicles 102, 106 via the wired connection 106 and/or via the second network 120 in order to control one or more brakes of the vehicle. For example, the dynamic brake modem 122 may receive a control signal from the vehicle 102, 104 or from an input/output device 124 ("SCIO" shown in FIG. 1 and described below) that reports the dynamic braking capability of the vehicle so that the braking capacity of the entire consist can be computed. The dynamic brakes can represent traction motors that operate in a regenerative braking mode in order to slow or stop movement of the vehicle. The dynamic brake modem is a FRA (Federal Rail Administration) required item for modern control systems.

The input/output device 124 represents one or more devices that receive input from an operator onboard the vehicle and/or that present information to the operator. The input/output device 124 may be referred to as a super centralized input/output device (one device), and can represent one or more touchscreens, keyboards, styluses, display screens, lights, speakers, or the like. The input/output device 124 is connected with the second communication network 120 and also is connected with a third communication network 126. The third communication network 126 also can be an Ethernet network, and may be referred to as a control Ethernet network, as shown in FIG. 1. This network can also be either single path or can be implemented in a redudant network.

Several display devices 128 may be connected with the input/output device 124 via the third network 126 and optionally may be connected with the input/output devices 124 and other components via the second communication network 120. An engine control unit 130 ("ECU" in FIG. 1) represents hardware circuitry that includes and/or is connected with one or more processors (for example, one or more microprocessors, field programmable gate arrays, and/or integrated circuits) that generate control signals communicated to an engine of the vehicle (for example, based on input provided by the input/output device 124) in order to control operation of the engine of the vehicle.

An auxiliary load controller 132 ("ALC" in FIG. 1) represents hardware circuitry that includes and/or is connected with one or more processors (for example, one or more microprocessors, field programmable gate arrays, and/or integrated circuits) that control operation of one or more auxiliary loads of the vehicle. The auxiliary loads may be loads that consume electric current without propelling movement of the vehicle. These auxiliary loads can include, for example, fans or blowers, battery chargers, or the like.

One or more traction motor controllers 134 ("TMC" in FIG. 1) control operation of traction motors of the vehicle. The traction motor controllers 134 represent hardware circuitry that includes and/or is connected with one or more processors (for example, one or more microprocessors, field programmable gate arrays, and/or integrated circuits) that generate control signals to control operation of the traction motors. For example, based on or responsive to a throttle setting selected by an operator input via the input/output devices 124 and communicated to the traction motor controllers 134 via a fourth communication network 136, the traction motor controllers 134 may change a speed at which one or more of the traction motors operate to implement the selected throttle setting.

In the illustrated example, the communication network 136 differs from the communication networks 114, 120, 126 in that the fourth communication network 136 may be a deterministic communication network. The fourth communication network 136 is an ARCnet control network, which is a deterministic communication network. A deterministic communication network may be a communication network that ensures successful communication between devices communicating with each other through the network by only allowing certain devices to communicate with each other at different times. In one example, a deterministic communication network 136 may only allow a device to communicate with another device during a time period that the device sending the communication has or is associated with a communication token. For example, if the input/output device 124 has the token during a first time period, then the input/output device 124 can send control signals or other signals to the display devices 128, the traction motor controllers 134, and/or a protocol translator 138 during the first time period, but none of the display devices 128, traction motor controllers 134, or protocol translator 138 may be allowed to send communications to any other device on the fourth location network 136 during this first time period.

During a subsequent, non-overlapping second time period, the protocol translator 138 may have the token and is allowed to communicate with other devices. No other components connected with the fourth communication network 136 other than the protocol translator 138 may be allowed to send communications during the second time period. In contrast, the Ethernet communication networks 114, 120, 126 may allow multiple, or all, devices connected to the respective network 114, 120, 126 to communicate with each other at the same time. For example, two or more of the components connected to the network 114, 120, and/or 126 can communicate with each other at the same time by concurrently or simultaneously sending data packets in the network 114, 120, and/or 126.

The protocol translator 138 ("PTP" shown in FIG. 1) represents hardware circuitry that converts a protocol of signals communicated by one or more additional devices 140 of the vehicle. These devices 140 may communicate using signals having a different protocol (e.g., a different syntax, a different format, or the like) than signals communicated by the devices communicating on the deterministic communication network 136. For example, the devices 140 may communicate with the protocol translator 138 over serial connections 142. The devices 140 may include sensors that monitor operation of the vehicle. Examples of these devices 140 include a location determining device (for example, a global positioning system receiver), an audio alarm panel ("AAP" in FIG. 1), an event recorder or log ("ER" in FIG. 1), a distributed power device ("DP" in FIG. 1, such as a device that coordinates operations of the vehicle with the operations of other vehicles 102, 104 in the same vehicle system), a head of train/end of train communication device ("HOT/EOT" in FIG. 1), an airbrake controller ("Air brake" in FIG. 1), a signaling controller ("Cab signal" in FIG. 1), a fuel gauge or fuel tank sensor ("FTM" in FIG. 1), or the like.

As shown in FIG. 1, the control system 100 includes many communication networks 114, 120, 126, 136, and the serial connections 140 of the devices 140. These many communication networks add increased cost and complexity to control system 100, and may provide for additional points of failure in a control system 100. Simply reducing the number of networks in the control system 100, however, may present additional problems. For example, merely connecting the devices that control movement of the vehicle (e.g., the input/output device 124, the display devices 128, the engine control unit 130, the auxiliary load controller 132, and/or the traction motor controllers 134) with an Ethernet network (that may or may not be connected with one or more of the devices 140) could result in so much information or data being communicated in the network that communications with the devices that control movement of the vehicle being prevented, interrupted, or otherwise interfered with.

Figure 2:
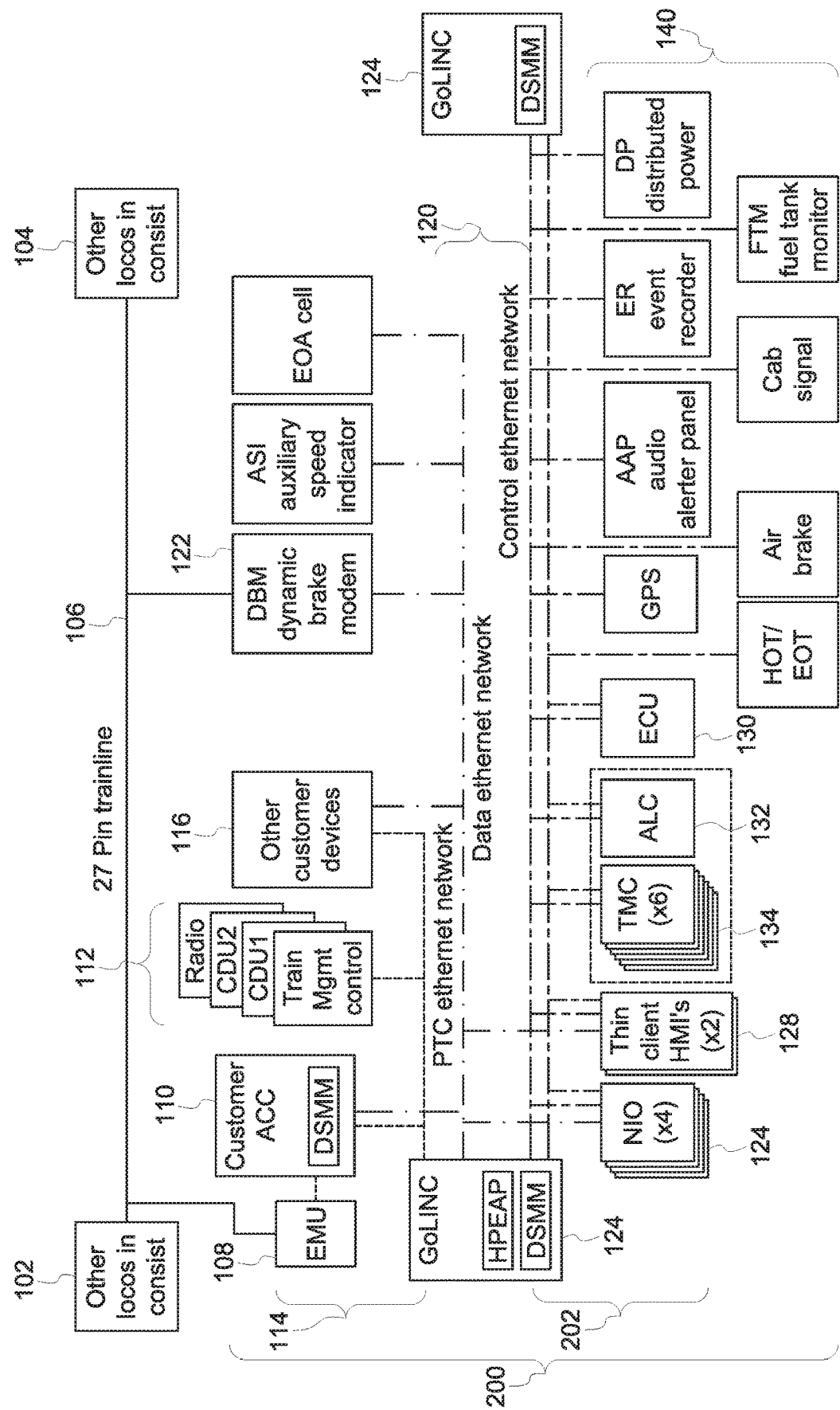
FIG. 2 illustrates a vehicle control system according to one embodiment of the inventive subject matter described herein.

FIG. 2 illustrates a vehicle control system 200 according to one embodiment of the inventive subject matter described herein. Similar to the control system 100 shown in FIG. 1, the control system 200 is described in connection with a rail vehicle system, but optionally may be used in connection with another type of vehicle, such as automobile, marine vessel, a mining vehicle, or the like. The control system 200 may be disposed onboard a vehicle in a vehicle system that includes the one or more other vehicles 102, 104. The wired connection 106 may communicatively coupled with the vehicle on which the control system 200 is disposed, as well as the vehicles 102, 104, as described above. The control system 200 includes many of the same components described above in connection with the control system 100.

One difference between the control system 100 and the control system 200 shown in FIG. 2 is that the devices 140 that do not control movement of the vehicle and the devices that control movement of the vehicle (e.g., the engine control unit 130, the auxiliary load controller 132, the traction motor controllers 134, the display devices 128, and input/output devices 124) are all connected with a common (e.g., the same) communication network 202. This communication network 202 may be an Ethernet network, such as a control Ethernet network. The network 120 described above in connection with FIG. 1 may also be present in the control system 200 and also may be connected with the display devices 128 and the input/output devices 124, as described above and shown in FIG. 2.

Another difference between the control systems 100, 200 is that the devices 140 are directly connected with the network 202 without having to be connected with the other devices 124, 128, 130, 132, 134 by the protocol translator 138 shown in FIG. 1. This allows for the devices 140 to directly communicate with each other and/or with the devices 124, 128, 130, 132, 134 without having to communicate via the translator 138.

One additional difference between the control systems 100, 200 is that the interface gateway 118 is not present between the communication networks 114, 120. Instead, one or more linking gateways 204 are connected with the communication network 202 and or the networks 114, 120, as shown in FIG. 2. The linking gateways 204 represent hardware circuitry that can control which signals are communicated between the different networks 114, 120, 202. For example, the linking gateways 204 can determine whether or not a communication is permitted to pass from one device connected with the network 120 to one or more devices connected to the network 202. The linking gateways 204 may receive one or more computing cards 206 that provide customizable functionality, such as one or more operations or functions desired by a customer or user of the control system 200. In contrast, the interface gateway 118 shown in FIG. 1, may not be customizable by an end-user, but instead may be instead the operations of the interface gateway 118 may be dictated by the manufacturer of the control system 100.

The devices 140 can provide data or other information that is useful for the monitoring and control of the vehicle system, but this information and data may be less important to the safe operation of the vehicle and vehicle system relative to communications and information communicated between other devices connected to the same network 202 (e.g., the input/output device is 124, the display devices 128, the traction motor controllers 134, auxiliary load controllers 132, and/or the engine control unit 130). For example, while determining the location of the vehicle may be useful from one of the devices 140, it may be more critical are important to the safe operation of the vehicle to be able to ensure communication between the traction motor controller and the input/output devices 124.

Connecting these more critical devices with less critical devices 140 on the same Ethernet network 202 could present problems with increased risk of communications to and/or from the more critical components not being received or sent to or from these components due to the increased traffic on the network caused by data indicated by the less critical devices 140. While communications to or from the devices 124, 128, 130, 132, 134 may be assigned with higher priorities than communications with the devices 140, the amount of data being communicated on the Ethernet network 202 may, at times, be too large to ensure the communications to or from the devices 124, 128, 130, 132, 134 are received.

In order to ensure these communications with the devices 124, 128, 130, 132, 134, 140 are sent and/or received in time (for example, that a change to a throttle setting received by the input/output devices 124 is received by the traction motor controllers 134 within a designated period of time, such as within a few milliseconds), the communication network 202 may operate as a data distribution service (DDS) running on a time sensitive network (TSN).

In one embodiment, the data distribution service is an object management group middleware communication standard for communication between and/or among the devices 124, 128, 130, 132, 134, 140 using the network 202. The devices 124, 128, 130, 132, 134, 140 that communicate using the data distribution service may be referred to as publishers and/or subscribers. A publisher is a device 124, 128, 130, 132, 134, 140 that provides data or information for one or more other devices 124, 128, 130, 132, 134, 140 to obtain. A subscriber is a device 124, 128, 130, 132, 134, 140 that receives or obtains this data or information (and performs some function using that data or information). The same device 124, 128, 130, 132, 134, 140 may be both a publisher of some data and a subscriber to other data. For example, the input/output device 124 may be a publisher of some data (e.g., instructions received from an operator to change a throttle setting) and a subscriber of other data (e.g., sensor data provided by one or more of the devices 140 for display to the operator).

In one embodiment, the data distribution service is used by the devices 124, 128, 130, 132, 134, 140 to communicate data through the network 202 that is established according to at least some of the standards developed by the Time-Sensitive Networking Task Group, which may include one or more of the IEEE 802.1 standards. In contrast to an Ethernet network operating without TSN that communicates data frames or packets in a random manner, the TSN network 202 may communicate data frames or packets according to a type or category of the data or information being communication. This can ensure that the data is communicated within designated time periods or at designated times. In other Ethernet networks, some data may not reach devices in sufficient time for the devices to operate using the data. With respect to some vehicle control systems, the late arrival of data can have significantly negative consequences, such as an inability to slow or stop movement of a vehicle in time to avoid a collision.

The TSN-based Ethernet network 202, however, can dictate when certain data communications occur to ensure that certain data frames or packets are communicated within designated time periods or at designated times. Data transmissions within the TSN-based Ethernet network 202 can be based on times or time slots in which the devices 124, 128, 130, 132, 134, 140 communicate being scheduled for at least some of the devices 124, 128, 130, 132, 134, 140. The communications between or among some of the devices 124, 128, 130, 132, 134, 140 may be time sensitive communications or include time sensitive data. Time sensitive communications involve the communication of time sensitive data within designated periods of time. For example, data indicative of a change in a brake setting may need to be communicated from the input/output device 124 to the traction motor controllers 134 within several milliseconds of being sent by the input/output device 124 into the network 202. The failure to complete this communication within the designated time limit or period of time may prevent the vehicle from braking in time. Other non-time sensitive communications may be communications that do not necessarily need to be communicated within a designated period of time, such as communication of a location of the vehicle from the GPS receiver, a measurement of the amount of fuel from the fuel sensor, etc. These non-time sensitive communications may be best effort communications or rate constrained communications.

Best effort communications may be communicated within the network 202 when there is sufficient bandwidth in the network 202 to allow for the communications to be successfully completed without decreasing the available bandwidth in the network 202 below a bandwidth threshold needed for the communication of time sensitive communications between publishers and subscribers. For example, if 70% of the available bandwidth in the network 202 is needed at a particular time to ensure that communications with the engine control unit 130 and traction motor controllers 134 successfully occur, then the remaining 30% of the available bandwidth in the network 202 may be used for other communications, such as best effort communications with the auxiliary load controller 132. The bandwidth threshold may be a user-selected or default amount of bandwidth. The communication of these best effort communications may be delayed to ensure that the time sensitive communications are not delayed.

Rate constrained communications are communications that are communicated using the remaining amount of bandwidth, if any, in the network 202. For example, a rate constrained communication may be sent between devices using the bandwidth in the network 202 that is not used by the time sensitive communications and the best effort communications. If no bandwidth is available (e.g., the time sensitive and best effort communications consume all the available bandwidth), then the rate constrained communication may not occur until more bandwidth is available.

The type of communication with a device may be set by the controller 110 and/or the operator of the system 200. For example, the controller 110 may designate that all communications to and/or from the engine control unit 132, the traction motor controllers 134, and the input/output devices 124 are time sensitive communications, communications to and/or from the display devices 128 and auxiliary load controller 132 are best effort communications, and the communications to and/or from the devices 140 are rate constrained communications. Optionally, the type of information being communicated by these devices may determine the type of communications. For example, the controller 110 may establish that control signals (e.g., signals that change operation of a device, such as by increasing or decreasing a throttle of a vehicle, applying brakes of a vehicle, etc.) communicated to the engine control unit 132 and/or traction motor controllers 134 may be time sensitive communications while status signals (e.g., signals that indicate a current state of a device, such as a location of the vehicle) communicated from the engine control unit 132 and/or traction motor controllers 134 are best effort or rate constrained communications. In one embodiment, different types of communication can be used to send command signals that control movement or other operation of a vehicle. For example, a command signal can be communicated to a vehicle in order to change a throttle of the vehicle, apply brakes of the vehicle, release brakes of the vehicle, or the like, as a time sensitive communication, a rate constrained communication, and/or a best effort communication.

Figure 3:
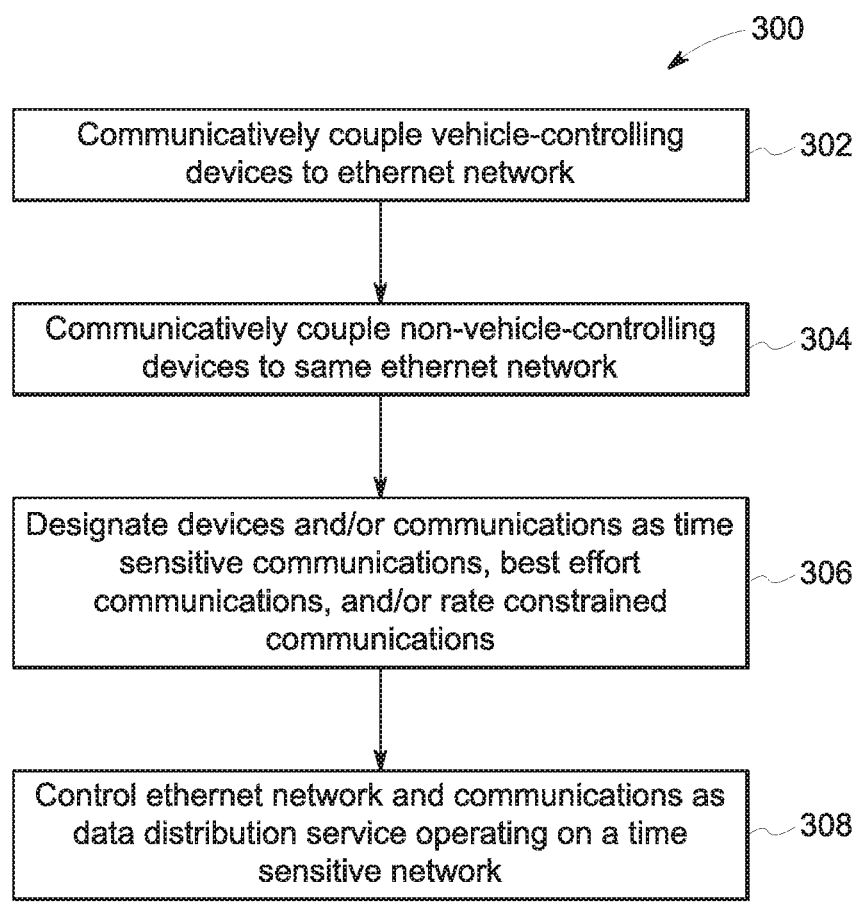
FIG. 3 illustrates one embodiment of a method for establishing a communication network between devices of a vehicle control system.

FIG. 3 illustrates one embodiment of a method 300 for establishing a communication network between devices of a vehicle control system. The method 300 may be used to create the network 202 shown in FIG. 2. At 302, several different vehicle-controlling devices 124, 130, 134 are communicatively coupled with each other by an Ethernet network. These devices 124, 130, 134 are components that operate to control a vehicle, such as by changing throttle settings, applying or disengaging brakes, or the like, to control movement of the vehicle.

At 304, several non-vehicle-controlling devices 128, 132, 140 are communicatively coupled with each other and with the vehicle-controlling devices 124, 130, 134 by the same Ethernet network as the vehicle-controlling devices 124, 130, 134. For example, the devices 128, 132, 140 may send and/or receive data that is used to monitor and/or diagnose operation of the vehicle, but that is not used to control movement of the vehicle during movement of the vehicle. These devices 128, 132, 140 may be connected with the same network as the vehicle-controlling devices 124, 130, 134 without a protocol translator being used to change protocols or other aspects of the communications from and/or to the non-vehicle-controlling devices 128, 132, 140.

At 306, the devices and/or communications connected to the same Ethernet network are designated as time sensitive communications, best effort communications, or rate constrained communications. As described above, the time sensitive communications may be communications with devices that need to be completed in a short period of time (e.g., within a designated period of time, such as thirty milliseconds) in order to ensure that the vehicle is safely controlled, while best effort and/or rate constrained communications may not need to be completed within such short periods of time.

At 308, the network is controlled as a data distribution service operating on a time sensitive network. The controller 110 can control communications within the network in this manner to provide a flexible Ethernet network that can have additional devices added to and/or devices removed from the network, without sacrificing or risking the time sensitive communications of some devices on the network. For example, the addition of a device 140 to the network 202 can be completed without the network 202 changing the communications to and/or from the devices 124, 130, 134 from time sensitive communications to another type of communication. The devices 124, 130, 134 may continue communicating with each other and/or other devices using the time sensitive communications of the network 202, while the new and/or other devices can continue communicating as best effort and/or rate constrained communications.

In one embodiment, a data distribution service as described herein can operate on a network that is operating as a time sensitive network implementation of the IEE 802.1 Ethernet standards.

In one embodiment, a control system includes a controller configured to control communication between or among plural vehicle devices that control operation of a vehicle via a network that communicatively couples the vehicle devices. The controller also is configured to control the communication using a data distribution service (DDS) and with the network operating as a time sensitive network (TSN). The controller is configured to direct a first set of the vehicle devices to communicate using time sensitive communications, a different, second set of the vehicle devices to communicate using best effort communications, and a different, third set of the vehicle devices to communicate using rate constrained communications.

In one example, the network is an Ethernet network at least partially disposed onboard the vehicle.

In one example, the vehicle devices include two or more of an input/output device, an engine control unit, a traction motor controller, a display device, an auxiliary load controller, and/or one or more sensors.

In one example, one or more of the engine control unit or the traction motor controller is included in the first set of vehicle devices using the time sensitive communications.

In one example, the controller is configured to direct the first set of the vehicle devices to communicate using the time sensitive communications such that the time sensitive communications are completed using bandwidth of the network while the second and third set of the vehicle devices communicate the best effort communications and the rate constrained communications using a remaining amount of bandwidth of the network that is not used by the time sensitive communications.

In one example, the vehicle is a rail vehicle.

In one example, the vehicle is an automobile.

In one embodiment, a control system includes a controller configured to control communication between plural vehicle devices that control one or more operations of a vehicle. The controller also is configured to control the communication between or among the vehicle devices through an Ethernet network while the Ethernet network operates as a time sensitive network (TSN). The controller is configured to direct a first set of the vehicle devices to communicate using time sensitive communications, a different, second set of the vehicle devices to communicate using best effort communications, and a different, third set of the vehicle devices to communicate using rate constrained communications.

In one example, the Ethernet network is at least partially disposed onboard the vehicle.

In one example, the vehicle devices include two or more of an input/output device, an engine control unit, a traction motor controller, a display device, an auxiliary load controller, or one or more sensors.

In one example, one or more of the engine control unit or the traction motor controller is included in the first set of vehicle devices using the time sensitive communications.

In one example, the controller is configured to direct the first set of the vehicle devices to communicate using the time sensitive communications such that the time sensitive communications are completed using bandwidth of the Ethernet network while the second and third set of the vehicle devices communicate the best effort communications and the rate constrained communications using a remaining amount of bandwidth of the Ethernet network that is not used by the time sensitive communications.

In one example, the vehicle is a rail vehicle.

In one example, the vehicle is an automobile.

In one embodiment, a control system includes a controller configured to control communications between plural vehicle devices onboard a vehicle through a time sensitive network (TSN). The controller is configured to direct a first set of the vehicle devices to communicate using time sensitive communications, a different, second set of the vehicle devices to communicate using best effort communications, and a different, third set of the vehicle devices to communicate using rate constrained communications.

In one example, the TSN network is an Ethernet network that is at least partially disposed onboard the vehicle.

In one example, the vehicle devices include two or more of an input/output device, an engine control unit, a traction motor controller, a display device, an auxiliary load controller, or one or more sensors.

In one example, one or more of the engine control unit or the traction motor controller is included in the first set of vehicle devices using the time sensitive communications.

In one example, the controller is configured to direct the first set of the vehicle devices to communicate using the time sensitive communications such that the time sensitive communications are completed using bandwidth of the TSN network while the second and third set of the vehicle devices communicate the best effort communications and the rate constrained communications using a remaining amount of bandwidth of the TSN network that is not used by the time sensitive communications.

In one example, the vehicle is a rail vehicle.

It is to be understood that the above description is intended to be illustrative, and not restrictive. For example, the above-described embodiments (and/or examples thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A control system comprising:
    a controller configured to control communication between or among plural vehicle devices that control operation of at least one vehicle via a time sensitive network (TSN) that communicatively couples the plural vehicle devices,
    the controller is configured to control the communication between or among the plural vehicle devices using a data distribution service (DDS) in the TSN, the DDS including an object management group middleware communication standard for the plural vehicle devices to communicate as publishers and subscribers, the TSN configured to communicate different types of information between or among the plural vehicle devices based on whether communication of the different types of information needs to be completed within one or more designated periods of time for safe operation of the at least one vehicle, and
    the controller configured to direct one or more of an engine control unit or a traction motor controller of the plural vehicle devices to communicate using time sensitive communications, the controller configured to direct at least one of (a) a different, second vehicle device of the plural vehicle devices to communicate using best effort communications, or (b) a different, third vehicle device of the plural vehicle devices to communicate using rate constrained communications.

2. The control system of claim 1, wherein the TSN is an Ethernet network at least partially disposed onboard the at least one vehicle that includes the plural vehicle devices.

3. The control system of claim 1, wherein the plural vehicle devices include two or more of an input/output device, the engine control unit, the traction motor controller, a display device, an auxiliary load controller, or one or more sensors.

4. The control system of claim 1, wherein the controller is configured to direct a first vehicle device of the plural vehicle devices to communicate using the time sensitive communications such that the time sensitive communications are completed using a first amount of bandwidth of the TSN while the second and third vehicle devices of the plural vehicle devices communicate the best effort communications and the rate constrained communications using a remaining amount of bandwidth of the TSN that is not used by the time sensitive communications.

5. The control system of claim 1, wherein the at least one vehicle is a rail vehicle.

6. The control system of claim 1, wherein the at least one vehicle is an automobile.

7. A control system comprising:
a controller configured to control communication between different sets of vehicle devices that control operation of a vehicle, the controller configured to control the communication between or among the vehicle devices through an Ethernet network while the Ethernet network operates as a time sensitive network (TSN) and using an object management group middleware communication standard,
the TSN configured to communicate different types of information based on whether communication of the different types of information need or do not need to be completed within designated periods of time for safe operation of the vehicle,
the controller configured to direct one or more of an engine control unit or a traction motor controller of the different sets of the vehicle devices to communicate using time sensitive communications, the controller configured to direct best effort communications or rate constrained communications.

8. The control system of claim 7, wherein the Ethernet network is at least partially disposed onboard the vehicle.

9. The control system of claim 7, wherein the different sets of the vehicle devices include two or more of an input/output device, the engine control unit, the traction motor controller, a display device, an auxiliary load controller, or one or more sensors.

10. The control system of claim 9, wherein one or more of the engine control unit or the traction motor controller is included in a first set of the different sets of the vehicle devices using the time sensitive communications.

11. The control system of claim 7, wherein the controller is configured to direct a first set of the different sets of the vehicle devices to communicate using the time sensitive communications such that the time sensitive communications are completed using bandwidth of the Ethernet network while a second set of the different sets of the vehicle devices communicates the best effort communications and the rate constrained communications using a remaining amount of bandwidth of the Ethernet network that is not used by the time sensitive communications.

12. The control system of claim 7, wherein the vehicle is a rail vehicle.

13. The control system of claim 7, wherein the vehicle is an automobile.

14. A control system comprising:
a controller configured to control communications between plural vehicle devices onboard a vehicle through a time sensitive network (TSN) using an object management group middleware communication standard,
the TSN configured to communicate different types of information based on whether communication of the different types of information need or do not need to be completed within designated periods of time for safe operation of the vehicle,
the controller configured to direct one or more of an engine control unit or a traction motor controller of the plural vehicle devices to communicate using time sensitive communications, the controller configured to direct at least one of (a) a first set of the plural vehicle devices to communicate using time sensitive communications, (b) a different, second set of the plural vehicle devices to communicate using best effort communications, (c) a different, third set of the plural vehicle devices to communicate using rate constrained communications.

15. The control system of claim 14, wherein the TSN is an Ethernet network that is at least partially disposed onboard the vehicle.

16. The control system of claim 14, wherein the plural vehicle devices include two or more of an input/output device, the engine control unit, the traction motor controller, a display device, an auxiliary load controller, or one or more sensors.

17. The control system of claim 14, wherein the controller is configured to direct the first set of the plural vehicle devices to communicate using the time sensitive communications such that the time sensitive communications are completed using bandwidth of the TSN while the second and third sets of the plural vehicle devices communicate the best effort communications and the rate constrained communications using a remaining amount of bandwidth of the TSN that is not used by the time sensitive communications.

18. The control system of claim 14, wherein the vehicle is a rail vehicle.

* * * * *